June 23, 1959   W. L. TEAGUE ET AL   2,892,169
TRANSFORMER CORE STRUCTURES
Filed Aug. 20, 1954
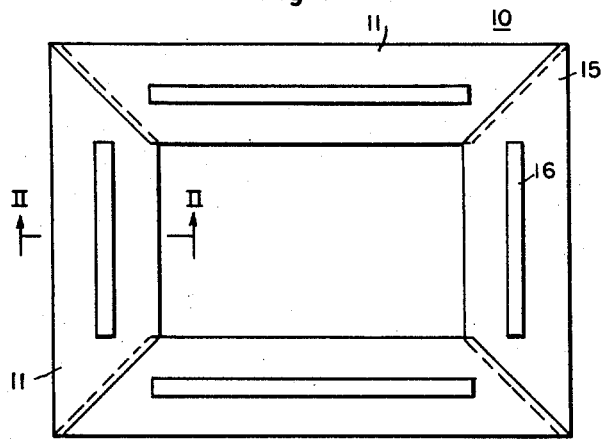
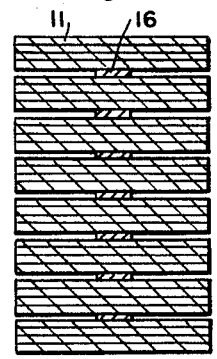
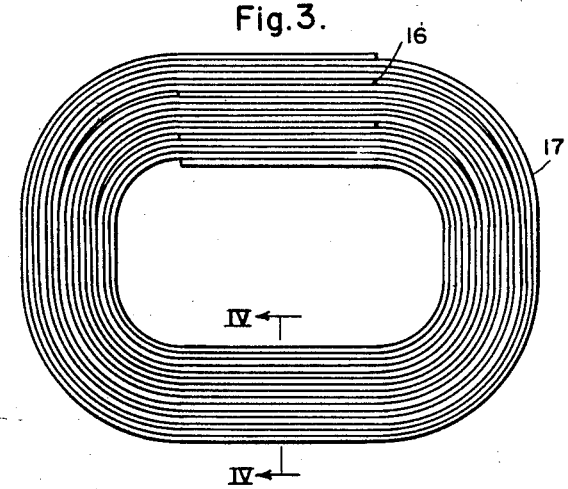
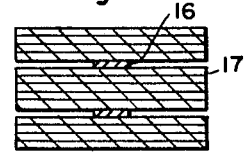
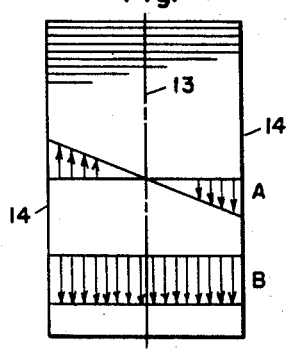
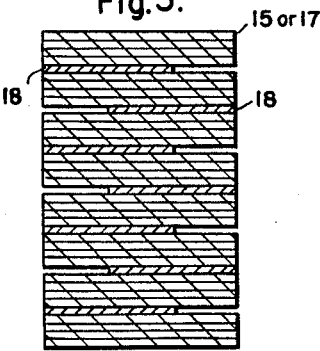
INVENTORS
William L. Teague
and James H. McWhirter.
BY
ATTORNEY United States Patent Office 2,892,169
Patented June 23, 1959

2,892,169

TRANSFORMER CORE STRUCTURES

William L. Teague, Sharon, and James H. McWhirter, Greenville, Pa., assignors to Westinghouse Electric Corporation, East Pittsburgh, Pa., a corporation of Pennsylvania Application August 20, 1954, Serial No. 451,181

7 Claims. (Cl. 336—213)

The invention relates generally to core structures and, more particularly, to laminated core structures for transformers and similar inductive apparatus.

The object of the invention is to provide for producing greater pressures between contacting faces of a laminated core structure substantially along the center line of the core structure than at the edges to lower the electrical resistance and dielectric strength between laminations substantially at the center line relative to the resistance and dielectric strength between laminations near the edges, to enable the construction of a low loss core structure.

Other objects of the invention will, in part, be obvious and will, in part, appear hereinafter.

The invention accordingly comprises the features of construction, combination of elements and arrangement of parts which will be exemplified in the construction hereinafter set forth and the scope of the application which will be indicated in the claims.

For a fuller understanding of the nature and objects of the invention reference should be had to the following detailed description taken in connection with the accompanying drawing, in which:

Figure 1 is a plan view of a shell form core constructed in accordance with this invention;

Fig. 2 is a view in section along the line II—II of Fig. 1;

Fig. 3 is a view in end elevation of a modification of a wound core constructed in accordance with the teachings of this invention;

Fig. 4 is a view in end elevation of a section of the core taken along the line IV—IV of Fig. 3;

Fig. 5 is a view in section of a laminated core structure which is a modification of the structure shown in Fig. 3 and which embodies the teachings of the invention; and Fig. 6 is a diagram of a core illustrating the voltages which are induced in the core and parts that will be referred to in the specification.

Referring now to the drawing and Fig. 1 in particular, the core shown generally at 10 comprises a plurality of laminations 11 of a predetermined width made from electrical sheet steel. Usually electrical sheet steel is an alloy of silicon and iron which has been reduced to gauge either by hot rolling or cold rolling. In both instances the film for insulating the laminations from one another is applied in the manufacturing process. Further, this invention is not intended to be limited to laminations of silicon iron, but may be practiced with any other metallic laminations from which cores may be made and which laminations are coated with an insulating film.

In the manufacture of cores for transformers and other inductive apparatus, it is necessary to subject the windings when on the cores to adequate tests to ascertain whether or not the transformer will meet the specifications for which it was designed. One of the tests ordinarily applied is an impulse test. The impulse test potential is usually applied to the coil or windings with which the core is fitted for shipment to a customer.

It has been found that after making impulse tests on transformers and similar induction apparatus that there may be a substantial increase in the core losses. Further, it has been determined that this increase in core loss is due to the electrical breakdown of the insulating films on the laminations or more commonly described as a rupturing of the inter-laminar insulation. If a breakdown of the insulation occurs during impulse test, then when the core is put into use there is a sizable flow of eddy currents and consequently substantial iron loss. The flow of eddy currents that result from the breakdown of the inter-laminar insulation is between laminations.

In order to explain the advantages and functioning of this invention, it is necessary to describe the cause of the rupture of the inter-laminar insulation during impulse tests. The energization of the windings on impulse test always applies to the inter-laminar insulation a voltage which has two voltage components, one an electrostatic voltage and the other an electromagnetic voltage.

The electromagnetic voltages applied can be illustrated by the arrows shown at A in Fig. 6. In view of the direction of flow of the flux the electromagnetic voltages are a maximum at the sides 14 of the core and in opposite directions and zero at the central plane 13. When the voltage breaks down the inter-laminar insulation at one side of the core, the voltage at the breakdown point drops to zero and the voltage at the other side is increased to about double and may cause another rupture of the inter-laminar insulation. If the insulation breaks down at two points there is a flow of current which is known as an eddy current. Such current flow causes substantial iron losses.

It has been found that the electrostatic component of voltage does not by itself cause an increase in iron loss since it generally causes only a single breakdown path through the inter-laminar insulation. Consequently no eddy current flow follows.

In the normal operation of a transformer, there will also be an electromagnetic component of voltage present in the core. This voltage is of lesser magnitude than the electrostatic component during the impulse test and varies differently with time but has the same distribution within the core. The electromagnetic component results from an induced voltage due to the continuously changing magnetic flux in the core. Further, it has been found that this electromagnetic voltage component will sustain a flow of eddy current, and as a result, build up a substantial core loss.

If both the electromagnetic and electrostatic components are present during impulse tests and of substantial magnitude, the increase in the iron loss may reach a substantial amount which is greater than it would reach if it were subjected to the electromagnetic component alone. Even though the electrostatic component alone is relatively ineffective in conjunction with the electromagnetic component it may, if of sufficient magnitude, double the effect of the electromagnetic component. In other words, the electrostatic voltage in conjunction with the electromagnetic voltage more readily effects a breakdown of the inter-laminar insulation.

The electrostatic stress due to the electrostatic voltage component may be reduced by reducing the core stack resistance. When this reduction of core resistance is made at the neutral plane, that is along the line 13 in Fig. 6, it will not affect the normal core loss since there is no electromagnetic voltage stress along this line. The electromagnetic voltage is applied generally as shown in Fig. 6, at A. Further, the same effect may be accomplished if the electrostatic breakdown can be restricted to the neutral plane away from the edges of the lamination. The application of the electrostatic component of voltage is also illustrated in Fig. 6, at B.

Since the electromagnetic component of voltage in the core is inherently related to the operation of the core, there does not seem to be any practical way to eliminate it. However, since the voltage stress due to the electromagnetic component of the voltage is zero at the neutral plane, that is along the line 13, and increases linearly to a maximum at the edges 14, we make use of this information in the invention which will be described in detail.

In the preparing of strips of electrical sheet steel for wound cores or laminations for the well-known core type and shell type cores, the electrical sheet steel is either slit or punched with a dye. In these operations, burrs are formed along the edges of the strip and laminations and because of these burrs, there is not as effective an insulating coating at the edges as in other areas of the strip or laminations. Therefore, along the edges where the electromagnetic component of the voltage is greatest, the insulation is weakest. In order to reduce the resistance and dielectric strength of the core stack at the neutral plane in either shell type, core type, or wound cores, means are provided for increasing the pressure between the contacting faces along the neutral plane, as for example, the line 13 in Fig. 6. As will be explained hereinafter different structures may be utilized for accomplishing an increase in the pressure along the neutral plane.

In cores made from stacked laminations, such as the shell type core shown in Fig. 1, or in the well-known core type core, a number of laminations 15 are stacked in any well-known manner which need not be described. When a partial stack has been built, strips of material 16, which are narrower than the laminations, are superimposed on the top laminations of the partial stack as shown. These strips of material may be electrical sheet steel of the same composition as the laminations. It would also be possible to employ copper strips or strips of any other metal capable of conducting electricity. It would also be possible to use strips of nonmagnetic material provided such strips carried a sufficient amount of metallic material to establish electrical connection between the laminations separated by the strips 16. However, strips 16 made of magnetic material are preferred since they also function as part of the core.

When cores provided with strips 16 are made, the weight of the laminations themselves will greatly increase the pressure between the contacting faces in the areas covered by the strips. As shown these strips will be disposed substantially along the center line of the laminations. Therefore, the pressure will be greatest along the neutral plane as represented by line 13 in Fig. 6. This pressure will be increased in transformers and other inductive apparatus when the well-known clamping frames for holding the laminations in position are applied. Further, it will be obvious that the pressures between edges of the laminations will be less than in the ordinary type of core structure which do not carry separating strips such as 16.

In wound cores, such as shown in Fig. 3 in the winding operation, the strips 16 will be inserted after a predetermined number of turns 17 have been made, thus giving a wound core simulating in cross section the core described hereinbefore.

As shown in Figs. 2 and 4, the stacked core and wound core look very similar in cross section. It has been found that the strips of material 16 when about ⅙ of the width of the laminations or strip from which the core is made give very satisfactory results.

The modification shown in Fig. 5 comprises a plurality of turns of strip 17 in wound cores or laminations 15 in stacked cores of a predetermined width. In making the cores after winding a predetermined number of turns 17 for wound cores or applying a predetermined number of laminations 15 in stacks, a turn or lamination 18, ⅔ of the width of the stock from which the core is made, is applied respectively, then the same number of turns of the strip or of laminations and another turn or lamination 18 of ⅔ of the width of the main turns or laminations. In the second instance, the narrower strip will be applied to the opposite side of the core and in overlapping relation with the first narrower strip. This insertion of the narrower strip and the staggering of it will be continued until the wound core or stack of laminations is completed.

As shown in Fig. 5, there are groups of laminations or turns 15 and 17 of electrical sheet steel of a predetermined width in the core and at intervals narrower strips 18 disposed on opposite sides alternately and in overlapping relation. The result is a core which, as shown, has a greater thickness of metal along the median line or along the neutral plane as represented by line 13 in Fig. 6. When the means for holding these cores together are applied, the pressure is greater at the center and less at the edges.

In this manner, the resistance and dielectric strength of the stack or wound core is greatly reduced along the neutral plane. Consequently, any breakdown of the interlaminar insulation which occurs due to the electrostatic voltage in impulse tests will be at the neutral plane where it is substantially harmless.

It will also be observed that the dielectric strength at the edges resulting from the light pressure is effective in reducing the breakdown caused by the electromagnetic component of the voltage which is greatest along the edges of the core.

A sufficient number of shell form transformers embodying the invention were tested and compared with other transformers that did not embody the invention. In the tests, it was found that transformer cores which did not embody the invention had an increase in iron loss after impulse testing which averaged 9.9% and a standard deviation of 6.2%. The term standard deviation refers to a scientific estimation that 68% of a very large number of cores would fall between the average plus the standard deviation and the average minus the standard deviations.

Cores embodying the invention were tested in the same manner and they showed an average increase in core loss of 4.5% and the standard deviation was 2.3%. This is a very unexpected improvement over apparatus of this kind as heretofore manufactured. One can readily appreciate that in the operation of transformers this will give a great saving.

Since certain changes may be made in the above construction and different embodiments of the invention could be made without departing from the scope thereof, it is intended that all matter contained in the above description or shown in the accompanying drawing shall be interpreted as illustrative and not in a limiting sense.

We claim as our invention:

1. In a wound core, in combination, a strip of electrical sheet steel of a predetermined width, a strip of electrically conducting material substantially narrower in width than the strip of electrical sheet steel, the two strips being wound in superimposed relationship to provide a wound core having a plurality of turns, the strips of electrically conducting material being disposed between at least a number of the turns of the strip of electrical sheet steel and substantially centrally of the wound core, whereby the pressures between the turns are greater centrally of the core than toward the edges.

2. In a wound core, in combination, a plurality of laminations of electrical sheet steel, the laminations being of a predetermined width, strips of electrical conducting material of the order of two-thirds of the width of the laminations, the laminations and the electrical conducting strip being wound, in interleaved relationship, the electrical conducting strip being present in a substantially smaller number of turns, alternate turns of the electrical strip being in substantially alignment with the opposite edges of laminations and overlapping one another in spaced relationship in the central portion of the core whereby the pressure between laminations and electrical conducting strip is greater in the central portion of the core than at the edges.

3. In a laminated core having electromagnetic stresses set up therein; a plurality of laminations of electrical sheet steel, said core having resistance between adjacent laminations; said electromagnetic stresses being maximum near the edges of said laminations and decreasing in magnitude linearly toward the middle of said laminations; and means adjacent an area of said laminations where said electromagnetic stresses are of less magnitude than near the edges of said laminations for rendering the resistance between adjacent laminations less than the resistance between adjacent laminations near the edges of said laminations.

4. In a laminated core having electromagnetic stresses set up therein; a plurality of laminations of electrical sheet steel, said core having resistance between adjacent laminations; said electromagnetic stresses being maximum in magnitude near the edges of said laminations and being minimum in magnitude near the center of said laminations; and means near the center of said laminations rendering the resistance between adjacent laminations of said core of less value near the center of said laminations than adjacent the edges of said laminations.

5. In a laminated core having electromagnetic stresses set up therein; a plurality of laminations of electrical sheet steel, said core having resistance between adjacent laminations; said electromagnetic stresses being maximum near the edges of said laminations and of less magnitude nearer the center of said laminations; and means comprising electrically conducting strips substantially narrower than said laminations placed between adjacent laminations near the center of said laminations to reduce the resistance between adjacent laminations adjacent the area where said electromagnetic stresses are a minimum.

6. In a laminated core having electromagnetic stresses set up therein; a plurality of laminations of electrical sheet steel, said core having resistance between adjacent laminations; said electromagnetic stresses being maximum near the edges of said laminations and decreasing linearly toward the center of said laminations; and electrical conducting means placed between adjacent laminations near the area where said electromagnetic stresses are a minimum to render the electrical resistance between adjacent laminations less than near the edges of said laminations.

7. In a laminated core having electromagnetic and electrostatic stresses set up therein; a plurality of laminations of electrical sheet steel, said core having resistance between adjacent laminations; said electromagnetic stresses being maximum near the edges of said laminations and decreasing linearly toward the center of said laminations, said electrostatic stresses being uniformly distributed from edge to edge of said laminations; and means disposed between said lamination near the area where said electromagnetic stresses are a minimum to reduce the resistance between adjacent laminations at the area where said electromagnetic stresses are a minimum, whereby should said electrostatic stresses cause a discharge between adjacent laminations said discharge will take place at the area where said electromagnetic stresses are a minimum.

References Cited in the file of this patent

UNITED STATES PATENTS

| 513,420 | Rowland | Jan. 23, 1894 |
| 2,561,462 | Compton et al. | July 24, 1951 |
| 2,579,560 | Ford | Dec. 25, 1951 |

FOREIGN PATENTS

| 20,423 | Great Britain | of 1901 |